US007799119B2

(12) United States Patent
Zakrzewski et al.

(10) Patent No.: US 7,799,119 B2
(45) Date of Patent: Sep. 21, 2010

(54) MICROWAVE PLASMA EXCITERS

(75) Inventors: Zenon Zakrzewski, Gdansk (PL);
Dariusz Czylkowski, Woj. Pomorskie (PL); Mariusz Jasinski, Woj. Wielkopolskie (PL); Michel Moisan, Outremont (CA); Daniel Guerin, Chelles (FR); Christian Larquet, Guyancourt (FR); Jean-Christophe Rostaing, Versailles (FR)

(73) Assignee: L'Air Liquide, Societe Anonyme pour l'Etude Et l'Exploitation des Procedes Georges Claude, Paris (FR)

( * ) Notice: Subject to any disclaimer, the term of this patent is extended or adjusted under 35 U.S.C. 154(b) by 503 days.

(21) Appl. No.: 11/766,875

(22) Filed: Jun. 22, 2007

(65) Prior Publication Data

US 2009/0020009 A1     Jan. 22, 2009

(51) Int. Cl.
*B03C 3/016* (2006.01)
(52) U.S. Cl. .......................... 96/15; 95/58; 118/723 R; 315/111.21; 333/246; 422/186
(58) Field of Classification Search .............. 95/57, 95/58; 96/15; 422/186; 333/13, 227, 246; 118/723 R; 315/111.21
See application file for complete search history.

(56) References Cited

U.S. PATENT DOCUMENTS

| | | | | |
|---|---|---|---|---|
| 4,698,822 A | * | 10/1987 | Leprince et al. | 372/70 |
| 4,745,337 A | * | 5/1988 | Pichot et al. | 315/111.41 |
| 4,944,244 A | * | 7/1990 | Moisan et al. | 118/723 MW |
| 4,963,842 A | * | 10/1990 | Patel | 333/13 |
| 4,965,540 A | | 10/1990 | Sullivan et al. | |
| 5,037,666 A | * | 8/1991 | Mori | 427/575 |
| 5,049,843 A | | 9/1991 | Barnes et al. | |
| 5,072,157 A | * | 12/1991 | Greb et al. | 315/248 |
| 5,360,485 A | * | 11/1994 | Bou et al. | 118/723 ME |
| 5,389,153 A | * | 2/1995 | Paranjpe et al. | 118/723 MP |
| 5,478,532 A | * | 12/1995 | Uhm | 422/186 |
| 5,489,818 A | * | 2/1996 | Naff et al. | 315/39 |
| 5,597,624 A | * | 1/1997 | Blinov et al. | 427/575 |
| 5,698,986 A | * | 12/1997 | Mays et al. | 324/636 |
| 5,750,823 A | * | 5/1998 | Wofford et al. | 588/316 |
| 6,204,606 B1 | | 3/2001 | Spence et al. | |
| 6,224,836 B1 | | 5/2001 | Moisan et al. | |
| 2003/0175181 A1 | | 9/2003 | Hall et al. | |

FOREIGN PATENT DOCUMENTS

EP   0 874 537   10/1998
GB   2 324 196   10/1998

OTHER PUBLICATIONS

International Search Report for PCT/FR2005/051136.
Rostaing et al. "*A Novel Post-Pump PFC Abatement Technology Based On Atmospheric Surface-Wave Microwave Plasmas*," Future Fab International, No. 14, Feb. 2003.
Moisan et al. "*Waveguide Based Single and Multiple Nozzle Plasma Torches: The TIAGO Concept,*" Plasma Sources Science and Technology, vol. 10, 2001, pp. 387-394.

* cited by examiner

*Primary Examiner*—Richard L Chiesa
(74) *Attorney, Agent, or Firm*—Patricia E. McQueeney

(57) ABSTRACT

The invention relates to a microwave plasma exciter device which includes a waveguide (23) for concentrating the microwaves; and a plasma generator (110, 120) for forming a plasma, which are disposed in a microwave concentration zone.

16 Claims, 8 Drawing Sheets

MICROWAVE PLASMA EXCITERS

TECHNICAL FIELD AND PRIOR ART

The invention relates to the field of atmospheric microwave plasma sources.

In particular, it relates to a method and a microwave plasma device, suitable for strongly and/or rapidly varying operating conditions.

Such conditions are encountered in environments such as gaseous effluents emitted by thin film deposition and etching methods for the production of semiconductors, when a plasma device is used to strip the pollutants from these effluents.

The plasma source serves to couple the microwave power with the discharge to maintain said discharge over long periods, by minimizing the fraction of power reflected to the generator (and hence lost for the application). The power is conveyed from the generator via a power transmission line, for example a hollow rectangular waveguide in one of the standard industrial sections. The transmission line is described physically by a distributed characteristic impedance.

The incident microwave power flux entering the plasma source sees a localized complex impedance which characterizes the way in which the energy is stored and dissipated in the source (input impedance of the plasma source).

The precondition for the reflected power to be zero is that the input impedance of the source must be equal to the characteristic impedance of the line.

The plasma source is composed of various physical elements each characterized by its own complex impedance: the plasma itself, the dielectric enclosure containing it if any, and conducting structures having appropriate geometries intermediate between the standard section transmission line and the plasma. The input impedance of the source is the equivalent resultant of these various impedances.

An attempt is made to associate elements having appropriate complex impedances so that the above-mentioned matching condition is satisfied for the assembled source.

In actual fact, for a given industrial application, the requirements are generally higher than simply obtaining a good impedance matching.

In fact, the impedance of the plasma depends on the operating conditions imposed by the application, which are not constant over time.

For example, a semiconductor fabrication process comprises several multistage acceptance tests using gases of different types and flow rates so that the pollution-stripping plasma must operate in conditions which are continually variable, and sometimes very abruptly so.

In order to maintain the optimal operating conditions of the pollution-stripping plasma permanently, elements whereof the impedance is adjustable could be added, such as, for example, mobile short-circuit pistons. However, in concrete terms, their adjustment cannot be preprogrammed for each process acceptance test, because the latter are formed randomly and their characteristics are generally not transmitted across the inspection interface between the manufacturing equipment and the pollution-stripping system.

It could also be possible to install motorized impedance adjustment systems servocontrolled by a measurement of the reflected power to permanently minimize the latter.

This would nevertheless add size, complexity and cost which would all be unacceptable to the device. Furthermore, the response time of such systems would often be too long for extremely rapid impedance variations imposed by the application.

In the documents of J.-C. Rostaing et al, entitled "A Novel Post-Pump PFC Abatement Technology Based On Atmospheric Surface-Wave Microwave Plasmas", Future Fab International, Issue 14, February 2003 and by M. Moisan et al, entitled "Waveguide Based Single And Multiple Nozzle Plasma Torches: The TIAGO Concept" appearing in Plasma Sources Science and Technology, Vol. 10, 2001, p. 387-394, two types of microwave plasma sources are described for the treatment of effluents from semiconductor fabrication processes.

One of these sources uses a surface-wave field applicator of the surfaguide type.

Another of these sources, the waveguide-supported axial injection torch (TIAGO), is used for the combined treatment of thin film CVD deposition effluents and of cleaning effluents from cleaning the CVD reactors for depositing the same thin films.

The principle of these sources is to concentrate the microwave energy in a section of the rectangular waveguide thinned in comparison with the standard section.

This comprises either two opposing orifices in its two large faces traversed by a dielectric tube (surfaguide), or one orifice in one of its large faces traversed by a conducting nozzle, defining a circular interstice in both cases.

The microwave power is extracted from the waveguide through this circular interstice, either to launch a surface wave along a dielectric tube (surfaguide) or to waveguide the microwave power along a conducting torch nozzle to bring about the generation of a plasma flame at the end of said nozzle.

In the thinned waveguide section comprising the interstice, the characteristic impedance seen from the wave which propagates is that of the thinned section waveguide, which is different from that of the standard waveguide.

This thinned waveguide section is connected to the standard waveguide section by two gradual thickness transitions: on one side, to the generator from which the microwave power arrives, and on the other, to a waveguide terminal short-circuit which is a conducting plate according to the cross section, fixed or mobile, closing the waveguide.

The gradual transitions play the role of impedance transformers. The microwave power then travels from one waveguide section to another section, these two sections having distinct characteristic impedances, unaffected by this change in characteristic impedance and hence without incurring undesirable interfering multiple reflections which would make the system deviate from the ideal behavior described by theory.

In calculating the equivalent input impedance of the source, the impedance transformer is simply taken into account by the ratio of the characteristic impedances of the waveguides in the two adjacent sections.

The geometric parameters influencing the impedances of the various elements are the slenderness ratio of the waveguide, the diameter of the power extraction interstice, the waveguide wall thickness at this point, even the roundoff of the edge of the orifice, and the position of the waveguide terminal short-circuit.

Their adjustment serves to obtain an optimized impedance matching.

These sources constructed on the thinned waveguide present substantially better impedance matching characteristics than those of the pre-existing sources.

In particular, the UPAS (Universal Plasma Abatement Systems) used industrially are equipped with a surfaguide source with a fixed short-circuit positioned in the factory and generally having a reflected power in operation that is lower than 5% for all the operating conditions encountered.

However, the range of conditions of use of the UPAS is steadily being extended as the processes become more complex with progress in microelectronic circuit miniaturization.

Thus new acceptance tests are appearing, employing novel additive gases which have a more pronounced effect than previously on the physical state of the microwave pollution-stripping plasma and on its impedance.

Furthermore, in certain cases, the practical conditions of use generate particularly severe transients which may make the system depart from the range in which the plasma can exist (coupling of a sufficient power to sustain it), causing the system to shut down. This is the case, for example, during the restarting of a roughing vacuum pump, where the instantaneous flow rate and pressure can reach values much higher than the normal average, or the switching of shutoff and bypass valves on exhaust lines.

With regard to the "TIAGO" (Microwave Axial Injection Torch), its structure is more complex than the surfaguide source. The nozzle of the torch comprises numerous design details which must be optimized during development: deflectors to control the gas flows and residence times in the plasma flame, clean-nitrogen injectors for inerting the nozzle tip and ceramic caps to protect the metallic parts from the high-energy fluorinated species, internal water-cooling lines, etc. Moreover, dielectric structures must be added to the field applicator for sealing against hazardous gases: a waveguide isolation window to isolate the pollution generator, and a spacer in the torch interstice to prevent the massive entry of particles and acidic water vapor into the waveguide section whereon said torch is constructed.

All these imposed arrangements modify the electrodynamic characteristics of the complete device. In general, it is found that the optimization parameters inherent in the thinned waveguide concept do not suffice to devise an acceptable impedance matching solution for a complete system designed to form the central active element of a CVD offgas pollution-stripping device.

The problem therefore arises of having plasma sources whereof the impedance matching is fairly insensitive to the variations in the plasma sustaining conditions imposed by its industrial use.

Preferably, an attempt is made to ensure that the relative reflected power is lower than 5% or 10% without, during use, needing to make adjustments to variable impedance matching devices.

DESCRIPTION OF THE INVENTION

The invention relates to a microwave plasma generation device, comprising:
a waveguide, in which means are placed for concentrating the microwaves,
means for generating a plasma, when the microwave power is coupled with these means, placed in a microwave concentration zone.

The microwave concentration means may comprise impedance transformation means between a first side, called the generator side, and a second side, called the short-circuit side.

The microwave concentration means, or the impedance transformation means, constitute a distributed capacitive load having the effect of reducing the phase velocity and hence decreasing the characteristic impedance of the waveguide, thereby increasing its frequency bandwidth.

The lowest characteristic impedance serves to obtain an optimal or easier impedance matching than the known devices, particularly since the inventive device has various elements having additional adjustable dimensions (particularly those of the wave concentration means) that the known devices, and particularly those discussed above, do not have.

The impedance transformation means may comprise a gradual transition zone, or discrete transformer means of the double quarter-wave type, or even an abrupt transition zone between the first part and the second part.

According to one example, a ridge extends along a longitudinal face of the waveguide.

Two symmetrical or asymmetrical ridges may be obtained, extending from two opposite longitudinal faces of the waveguide.

An example of an inventive device comprises a rectangular section waveguide, having a ridge. The cross section of such a waveguide comprises an appendage or an edge (rectangular or parallelepipedal), which may be continuous, extending from a large side face of the waveguide. According to an alternative, a waveguide with two symmetrical or asymmetrical ridges can be used, extending from the opposite faces of the waveguide, with the same physical effects.

If the waveguide has a width a, and the microwave concentration means have a width s, then a>s, the s/a ratio preferably being between 0.3 and 0.6.

According to one embodiment, the waveguide comprises a generator side and a short-circuit side, and has a gradual termination on the generator side and an abrupt termination in a cross section of the ridge on the short-circuit side.

DETAILED DESCRIPTION OF PARTICULAR EMBODIMENTS

Figure 1A:
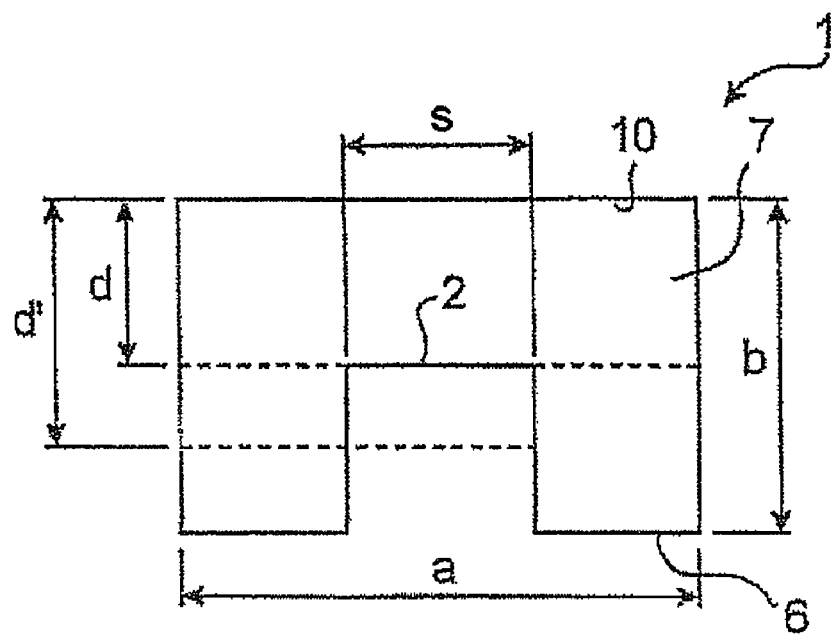
FIGS. 1A-1C show the generic section of a ridge guide.
Figure 1B:
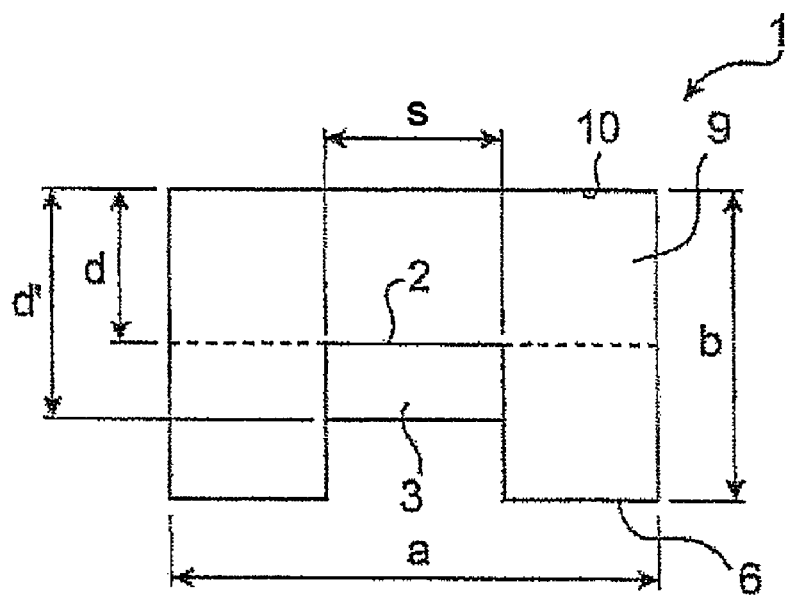
Figure 1C:
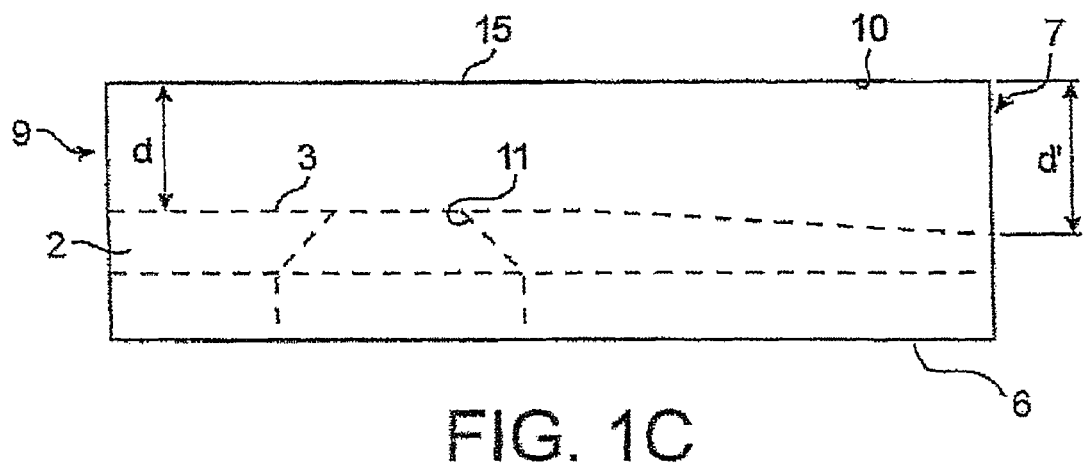

A waveguide 1 usable in the context of the invention is shown in FIGS. 1A-1C.

This is a rectangular section waveguide (a×b) with a ridge 2 of width s.

The cross section of such a waveguide comprises an appendage 2, for example having a rectangular section extending along a large side face 6 of the waveguide, and between a first cross section of the waveguide 7 (view in FIG. 1A) of a first end and a second cross section of the waveguide 9 (FIG. 1B) of a second end.

Geometries of the ridge cross section, other than rectangular, can be obtained.

According to one example, a very thin ridge can be obtained, with s<a.

The waveguide is designed to be connected at its two end cross sections 7 and 9, respectively on the generator side and on the short-circuit side, to adjacent standard hollow rectangular section waveguide sections.

As shown in these FIGS. 1A-1C, the ridge 2 may comprise a continuous parallelepipedal edge, distant from the large side face 10, opposite to the face 6, by a variable distance between a value d (first face side 7) and a value d'>d (second face side 9).

As shown in FIG. 1C, the ridge 2 comprises an inclined part and then a plane part 3, the latter being located at a substantially constant distance d from the longitudinal face 10.

In the waveguide, the ridge constitutes a distributed capacitive load having the effect of reducing the phase velocity and hence decreasing the characteristic impedance of the waveguide, thereby increasing the frequency bandwidth. This also proves to have the effect of extending the range of values of the operational parameters for which optimized impedance matching can be obtained. This is particularly the case when a mobile short-circuit piston is used at the end of the waveguide: the range of variation of the position of the mobile piston is then extended.

A microwave energy concentration takes place in the free space defined between the plane upper face 3 of the ridge and the opposite face 10 of the waveguide.

A waveguide according to one of the embodiments described above in conjunction with FIGS. 1A-1C comprises two additional geometric parameters compared to a hollow waveguide: the width s of the ridge (s<a) and the distance d from its upper face 10 to the opposite plane face 3 of the waveguide.

Figure 2:
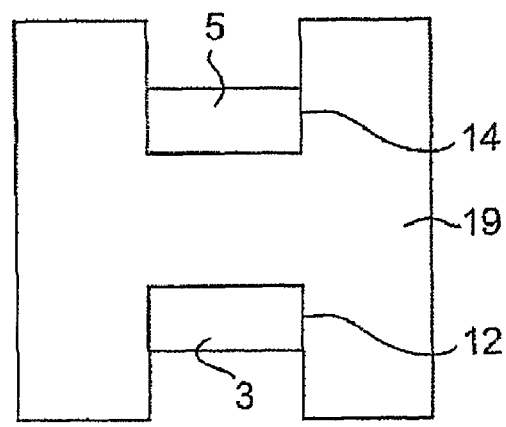
FIG. 2 shows a dual ridge configuration.

According to another embodiment, shown in FIG. 2 in a front view, a waveguide can be used in which two symmetrical or asymmetrical ridges 12, 14 are obtained, one on or along each of the longitudinal faces, each of these ridges possibly having the shape shown in FIG. 1C. In this case, the energy is concentrated between the plane faces 3, 5 of the two ridges 12, 14. FIG. 2 shows the view from the side face 19, where the two ridges have their thinnest portions.

According to one alternative of this second embodiment, the two ridges may have different values of s and/or of a.

According to a further alternative of this second embodiment, it is possible to have s<a for one of the ridges and s=a for the other: in other words, a single true ridge extending from one of the large faces of the waveguide, but in an already thinned section thereof.

Based on the ridge waveguide dimensions, it is possible, at a given frequency, to determine the cutoff wavelength $\lambda_c$ and the wavelengths of the permissible propagation modes $\lambda_g$, and particularly the fundamental mode.

The equations giving these values are more complex than in the case of the hollow rectangular waveguide, not comprising means for optimizing the impedance matching such as the ridges. They are not available in simple analytical form but can be obtained by numerical calculation and/or experiment.

The characteristic impedance of a ridge waveguide can be found using the following equations:

$$Z_0 = Z_{0\infty} \frac{\lambda_g}{\lambda}$$

where $\lambda$ is the wavelength in the free empty space, $$\frac{\lambda_g}{\lambda}$$

is given by the parameterized curves taken from the literature, for example in the work by J. Helszajn "Ridge Waveguides and Passive Microwave Components", the IEE, London, and the cutoff wavelength $\lambda_c$ and $$Z_{0\infty} = Z_0 \frac{\lambda}{\lambda_g} = \frac{2d\eta_0}{\frac{\lambda_c}{2}\left[\sin\theta_2 + \frac{d}{b}\cos\theta_2\sin\frac{\theta_1}{2}\right]}$$

where $\eta_0 = 120\pi(\Omega)$, characteristic impedance of the free space, $$\theta_1 = \frac{(a-s)\pi}{\lambda_c}$$

$$\theta_2 = \frac{s\pi}{\lambda_c}.$$

In general, for moderate values of s/a (~0.3÷0.6), the properties of the ridge waveguide are only slightly dependent on s/a, which offers flexibility in the choice of the width (difference a−s) of the ridge for the practical preparation of a field applicator.

However, $\lambda_g$ depends on d/a and therefore varies when the ridge height varies along a transition. This effect had no equivalent in the case of the thinned waveguide, because $\lambda_g$ did not depend on the thickness thereof.

The embodiment described above serves, as already stated, to match the impedances distributed and localized between the various elements constituting a plasma source constructed on the waveguide between one side 7 of the waveguide (generator side, designed to receive the microwave power injected into the waveguide) and a side 9 (short-circuit side, for obtaining a matching short-circuit at the other end of the waveguide), so that the equivalent input impedance (the resultant in particular of that of the plasma and of the means for creating it in the concentration zone) seen from the generator side can, by adjusting for example an adjustable impedance on the short-circuit side, be equalized with the characteristic impedance of the hollow rectangular waveguide delivering the power.

According to another aspect, the invention relates to impedance transformation means, between a ridge section where the microwaves can be concentrated at a standard section, for obtaining a field applicator in order to obtain the effective coupling of the microwave power with a plasma.

The impedance transformation means used can accordingly be used to adjust the ridge waveguide section to the section of a standard waveguide, for example a hollow rectangular waveguide, in particular so that the input of a plasma source can be connected to microwave means of a standard type (whereof the inputs and outputs are preferably for a hollow rectangular waveguide and not a continuous ridge waveguide).

One possibility (FIG. 3A) is to use a gradual transition 22, terminating in a "wedge" a ridge section 24 inserted into a waveguide having upper 20 and lower 26 side faces.

The length $l_{11}$ of the transition is then preferably $\lambda_g/2$, or an integer multiple thereof, to avoid interfering wave reflections.

However, the value of $\lambda_g$ depends on the relative height of the ridge d/a, and hence $\lambda_g$ varies along the transition 22. It is consequently preferable to take account of a mean value of $\lambda_g$ to calculate the real length of this transition 22.

Other possibilities are available for obtaining the impedance transformation.

Figure 3A:
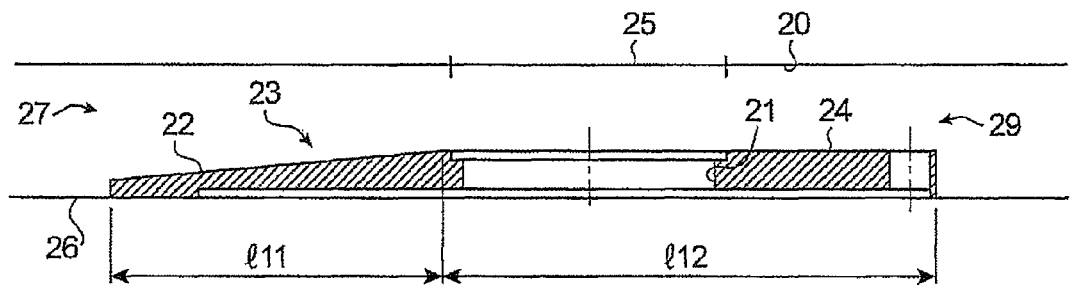
FIGS. 3A-3C show various embodiments of a ridge which can be used in the context of the invention.
Figure 3B:
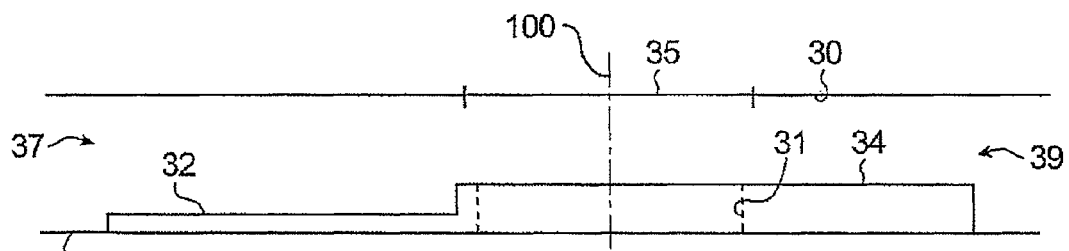
Figure 3C:
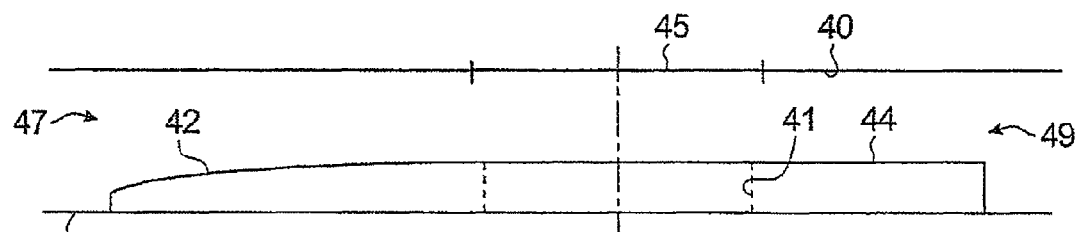

For example, a discrete double quarter-wave transformer 32, 34 as illustrated in FIG. 3B, or abrupt transitions from the ridge waveguide to the standard waveguide, can be made, that is, the ridge having a constant height terminates on a cross section truncation, or a transition can be obtained from a curved surface 42 to a plane or nearly plane surface 44 (FIG. 3C); one interesting case is that in which the ridge height profile obeys dY/dz=constant where Y is the local impedance and z the distance along the waveguide axis.

In FIGS. 1C, 3A-3C, the references 11, 21, 31, 41 denote the orifices for inserting a device or means such as a torch, for generating a plasma, the references 15, 25, 35, 45 each denoting an orifice in the waveguide wall also for the passage of such means. It is also possible to use means of the surface-wave field applicator type traversed by a hollow dielectric tube inside which the plasma is maintained, and provide the corresponding matchings in the ridge(s) and face(s) of the waveguide.

The structure of a device according to the invention is not necessarily symmetrical and a different impedance transformer solution can be used on either side of the ridge guide section. Certain configurations may be preferable for their matching performance and/or their compactness.

According to the invention, the internal guide ridge defines a confined space between its upper face and the large opposite face of the waveguide, for concentrating the microwave energy to obtain an effective coupling for the maintenance of a plasma.

It also serves to match the localized and distributed impedances of the various elements of the plasma source: transitions between different waveguide sections, microwave energy coupling zone at the circular interstices, torch nozzle or surface-wave dielectric tube charged by the plasma, mobile matching short-circuit on the side opposite the power inlet from the generator.

Thus the equivalent input impedance of the generator side plasma source, the resultant of these various impedances, can be made substantially equal to the characteristic impedance of the standard hollow rectangular waveguide conveying the microwave power from the generator, particularly when the mobile short-circuit piston is used on the opposite side of the waveguide.

In an alternative, the impedance transformation and microwave energy concentration zones have no clear separation, that is, there is a gradual height transition of the ridge between the inlet (generator side) of the waveguide section on which the plasma source is constructed, and the zone where the microwaves are coupled to the plasma. The length of the transition zone is then selected, as previously, as a mean value to take account of the variation in fundamental wavelength $\lambda_g$ with the variable height of the ridge.

Furthermore, the internal ridge of the waveguide produces a distributed capacitive load for reducing the phase velocity and hence the characteristic impedance of the waveguide.

In addition to the increase in the frequency bandwidth of the waveguide, an extension of the range of operating conditions is obtained (that is, the range of variation of the plasma impedance) for which the impedance matching is optimal, without having to change the settings of a mobile matching short-circuit during operation.

The structure of the ridge may assume numerous shapes which represent combinations of elements whereof the impedance depends on their geometric characteristics.

The corresponding mechanical modifications can be made by replacing a ridge by another differently machined ridge. The presence of the ridge serves to obtain an optimized matching of the equivalent impedance for the waveguide section supporting the plasma source, comprised between one side 7, 27, 37, 47 (generator side, designed to receive the microwave power injected into the plasma source) and a side 9, 19, 29, 39, 49 (short-circuit side).

The impedance matching can be further improved using a mobile short-circuit located at the end of the waveguide opposite the generator side.

Figure 5A:
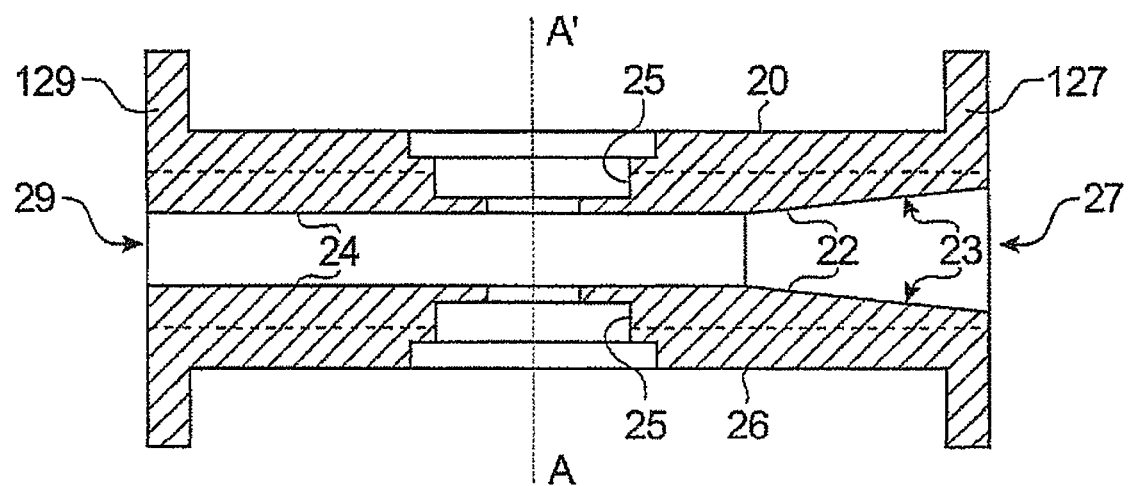
FIGS. 5A-5C show cross sections and perspective views of a device according to the invention.
Figure 5B:
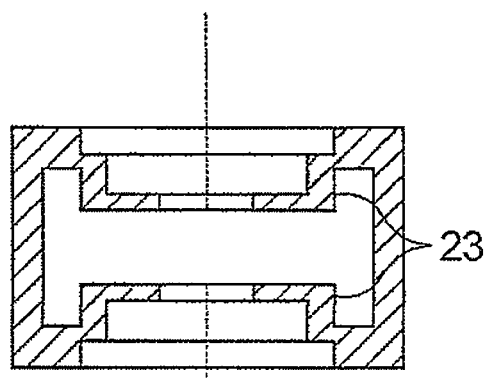
Figure 5C:
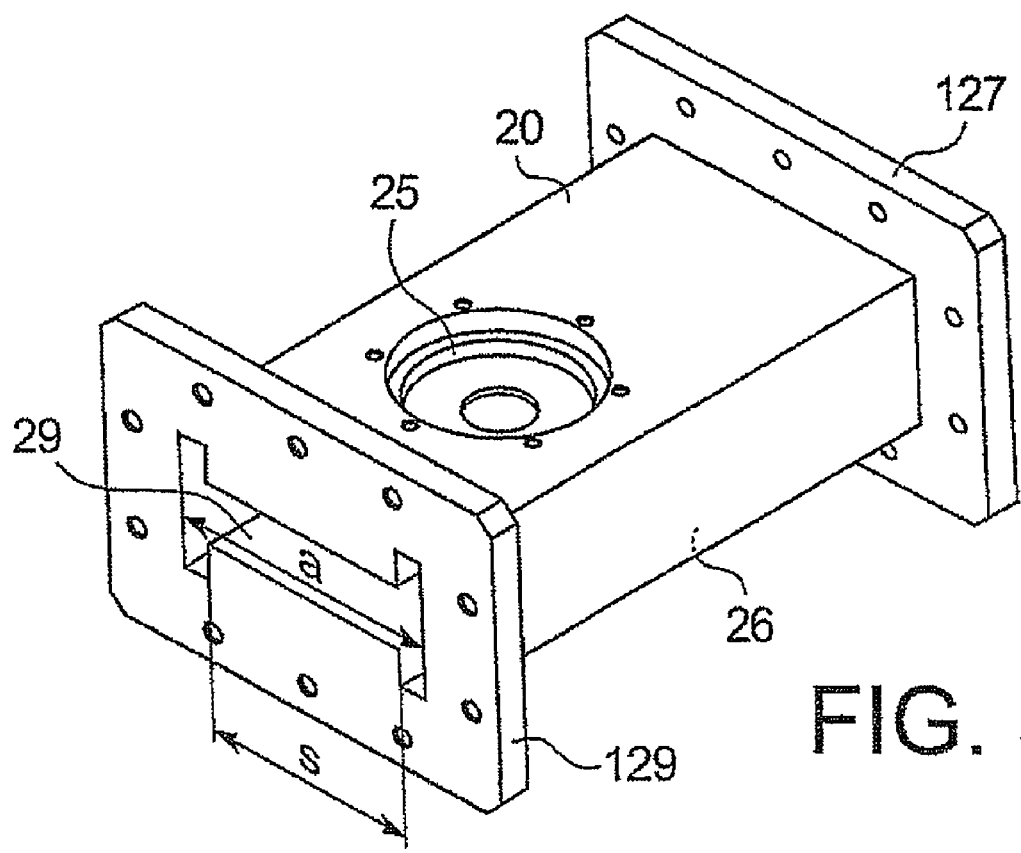

FIGS. 5A-5C represent a waveguide equipped with two ridge impedance transformers 23 of the type shown in FIG. 3A. The wall waveguide 20, 26 is a conventional waveguide, whereof the inner walls are equipped with two transformers 23. A more detailed description of this example is given below.

In the rest of the specification, for convenience, and depending on each case, the impedances (notation Z) or their reverse, the admittances (notations Y), are used, for example $Y_0 = Z_0^{-1}$ for the characteristic quantities of the standard waveguide.

In the context of the present invention, standard waveguide means the hollow rectangular waveguide in one of the standard dimensions for the industrial microwave equipment, not equipped with means forming a ridge or forming the impedance matching as described above.

A standard quantity is also used for the impedances $Z_0$ or the admittance $Y_0$ characteristic of the standard waveguide, denoted in lower case:

$$y = \frac{Y}{Y_0} 0 = z^{-1} = g + jb = (r + jx)^{-1}$$

In this expression, and in the rest of the discussion, the quantities G or g, and B or b, real and imaginary parts of the complex admittances, respectively represent the dispersion and absorption in the various parts of the waveguide and of the plasma source, that is, the storage or dissipation of the microwave energy.

Figure 4A:
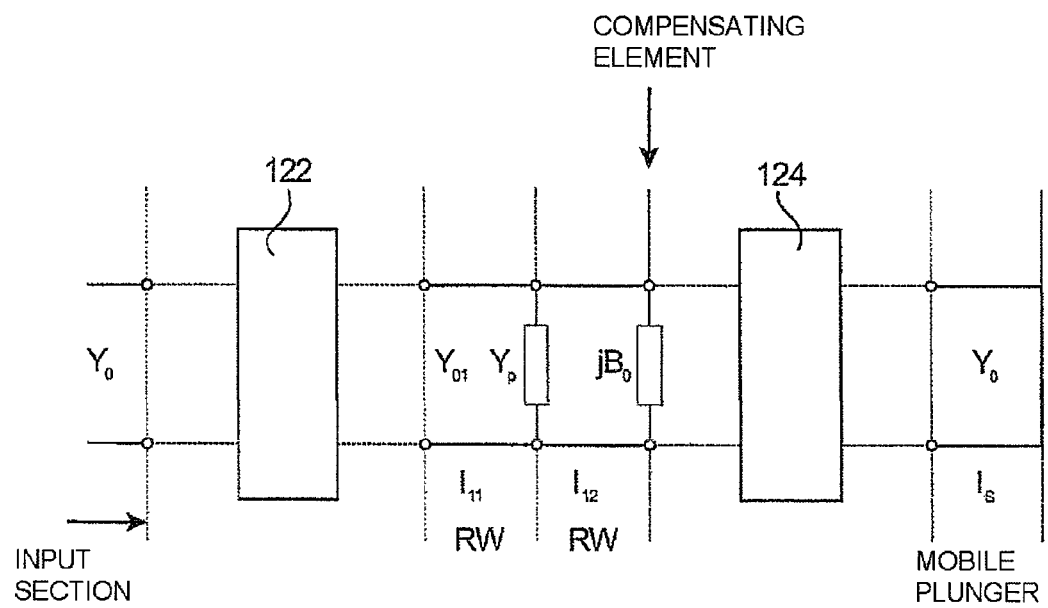
FIGS. 4A and 4B show a generic diagram of a field applicator of a ridge waveguide, and an equivalent wiring diagram.
Figure 4B:
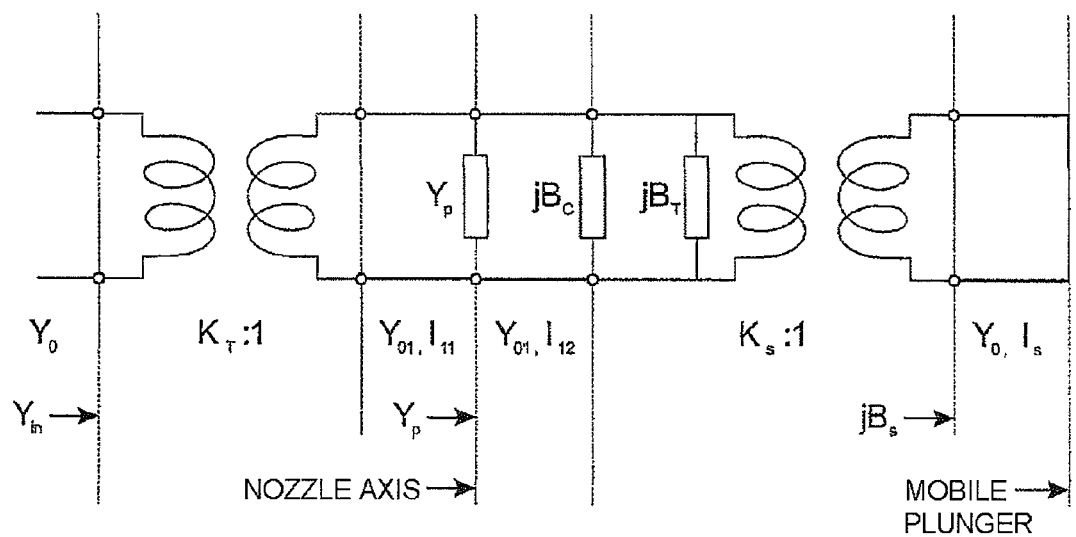

FIGS. 4A-4B schematically represent various elements of a source according to the invention, viewed from the electrical standpoint.

FIG. 4A shows the generic diagram of the ridge waveguide field applicator.

FIG. 4B shows the equivalent electrical circuit, for better illustrating the electrodynamic behavior of the various elements.

The meanings of the notations in FIGS. 4A and 4B are given below:

$$Y_p = G_p + jB_p$$

is the resultant admittance of the interstices loaded by the plasma generating means and this plasma, for example a dielectric tube and the plasma or a torch nozzle and the plasma flame, admittance referenced on the transverse symmetrical plane coinciding with the tube or nozzle axis (in FIG. 3B: the plane 100).

In addition to the characteristics of the plasma itself, $Y_p$ depends on the structure of the field in the coupling zone.

This in turn depends on the characteristics of the plasma generating means, for example of the dielectric constituting the surface-wave tube, the geometry of said tube or that of the torch nozzle, and in both cases, on the geometry of the interstice:slenderness ratio (hence ridge height), diameter of the orifice(s) 11, 15, 21, 25, 31, 35, 41, 45, thickness of the waveguide wall 10, 20, 30, 40 at this level and even roundoff of the orifice edges.

$Y_p$ is experimentally accessible, serving to orient the optimization by successive approximations while modifying the geometric parameters.

$Y_0$ and $Y_{01}$ are respectively the characteristic admittance of a standard rectangular waveguide (without ridge or without impedance matching means according to the invention) and with a ridge.

$Y_{01}$ is hence the characteristic impedance in the waveguide section where the microwave energy concentration zone is located, in order to couple this microwave energy with the plasma in an optimized manner using the impedance matching means according to the invention.

$$k_T = \frac{Y_0}{Y_{01}}$$

is, by definition, the transformation factor of the input transformer (power input side).

$l_{11}$ is the distance from the end of the input transformer 122 (in fact: the zone 22, 32, 42 in FIGS. 3A-3C) to the transverse plane of symmetry of the plasma generating means (surfaguide or torch, the plane 100 in FIG. 3B, perpendicular to the plane in this figure, or the plane AA' in FIG. 5A), coinciding with the axis of the plasma generation means (for example tube or nozzle). This axis is the place where the power is extracted from the waveguide to be coupled with the plasma. $l_{11}$ is preferably an integer multiple of $\lambda_{gl}/4$, serving to avoid the phase differences that will be responsible for wave reflections.

Here, and further below, $\lambda_{gl}$ denotes the wavelength in the ridge waveguide (hence in the section where the energy is concentrated and transmitted to the plasma) to distinguish it from the wavelength $\lambda_g$, in the standard waveguide, not equipped with impedance matching means according to the invention.

$l_{12}$ is the distance from the transverse plane of symmetry indicated above, to the adjacent end of the second impedance transformer 124. In fact, in FIGS. 3A-3C, this impedance transformer 124 consists of the ridge step, a step that is located at the end 29, 39, 49. This impedance transformer could have another shape, particularly the same as that of the generator side transformer, as a gradual wedge, or a double discrete quarter-wave, etc. However, it is conceivable that the abrupt termination of the ridge at a cross section truncation, provided it is satisfactory from the electrodynamic standpoint, is the more compact.

$l_{12}$ is also preferably an integer multiple of $\lambda_{gl}/4$ for the same reasons as those indicated above.

$k_s = k_T^{-1}$ or $k_s = 1$ is the transformation factor of the second impedance transformer (short-circuit side), for the gradual wedge or abrupt step configuration (ridge terminating on a cross section, which is the case in FIGS. 1C, 3A-3C), respectively.

$l_s$ is the distance between the transformer end plane (in the cases discussed, the short-circuit side step) and the waveguide terminal short-circuit plane. $l_S$ adjustable by a mobile short-circuit (for example a mobile plunger), which can be used when developing the source and which can be fixed subsequently.

$B_s = Y_0 t_s^{-1}$ where $$t_s = \tan\left(\frac{2\pi l_s}{\lambda_g}\right)$$

is the susceptance introduced by the short-circuit, referenced at the end plane of the second transformer.

It can be adjusted by varying $l_s$, that is, by shifting the short-circuit.

The input admittance (or impedance) of the surfaguide or of the torch, normalized to the characteristic impedance of a standard power waveguide, for example a hollow rectangular section waveguide, is written:

$$y_{in} = \left(z_{in} = y_{in}\frac{Y_{in}-1}{Y_0}\right).$$

It defines the fraction of the incident power reflected at the input of the applicator:

$$\frac{P_R}{P_I} = \left|\frac{z_{in}-1}{z_{in}+1}\right|^2 = \left|\frac{y_{in}-1}{y_{in}+1}\right|^2$$

The matching characteristics are defined as $$\frac{P_R}{P_I}$$

as a function $$\frac{l_s}{\lambda_g}.$$

These characteristics also indicate the sensitivity of the impedance matching other parameters than $l_s$, and in particular the admittance of the plasma.

The reduced input admittance of the source $y_{in}$ can be expressed as a function of the admittances of the various elements which are selected to be assembled to constitute it.

$y_{in}$ will therefore depend on the resultant admittance of the coupling interstice of the energy loaded by the plasma, the transformation ratios of the two impedance transformers and the phase factors corresponding to the progression of the wave in the constant section ridge waveguide section, over the distances $l_{11}$ and $l_{12}$, which are in fact equal to ±1, due to the multiple values of $\lambda_{g1}/4$.

To design an applicator, a basic configuration is selected: the generic type, for example, comprises two transformers (on the power input side from the generator and on the short-circuit side). Values of $l_{11}$ and $l_{12}$ are also selected. The theoretical impedance matching characteristics can then be plotted from various values of the parameters $g_p$, $b_p$ (conductance and susceptance normalized to the interstice loaded by the plasma) and $k_T$ to examine their effect on the shape of the curves, and particularly the value of the minimum and the width of the range of variation of $l_s$ for which $P_R/P_I$ is lower than a fixed value, by 10% for example. An initial conjecture is accordingly established of the dimensional parameters of an applicator from data in the literature on referenced structures whereof the characteristics (standard section waveguides, thinned waveguides, ridge waveguides, transformers, etc.) are known, and from calculations. Reference can be made to the work by J. Helszajn already mentioned.

Once the applicator is constructed, by adjusting the parameters of the calculated characteristics on the experimental curves, the values of $g_p$, $b_p$ and $k_T$ are extracted.

An indication is thereby obtained on the manner in which the dimensions of the device must be modified so that in the following test, the characteristic approaches the desired optimal shape. The measured value of $k_T$ can also be compared to its theoretical value to judge the appropriateness and consistency of the method.

In fact, additional degrees of freedom are still available for making this optimization. The real impedance transformers are generally imperfect and introduce residual admittance discontinuities so that their effect is not simply described by the transformation ratio $k_T$ or $k_S$. A capacitive term $j_{BT}$ is added, whereof the effect is to distort the matching characteristics. Instead of presenting a relatively constant value of the minimum of $P_R/P_I$ over a range of variation of a certain width, the curve presents an inclined base. However, this undesirable effect can be offset by adding inductive compensating elements $j_{Bc}$.

These elements are shown in FIGS. 4A and 4B.

Physically, they can assume various forms. The equivalent of these elements is not found in the thinned waveguide applicator technology as known today.

One exemplary embodiment is the following.

After tests, it was found that the following combination offered a good compromise between the quality of the impedance matching and the compactness (total length of the ridge waveguide section):

$$l_{11} = \frac{\lambda_{g1}}{4}, l_{12} = \frac{\lambda_{g1}}{2},$$

$k_s=1$ (i.e. the ridge terminates abruptly on the short-circuit side). The generator side transformer is a gradual wedge. Surprisingly, a gradual structure on the short-circuit side can be discarded, without altering the electrodynamics of the device. This serves to obtain a substantial gain in the overall length of the device, for which the minimum possible values of $l_{11}$ and $l_{12}$ have already been taken.

By applying the conventional laws of association of admittances between the plasma and the standard input waveguide (assuming that the impedance transformers are perfect, that is that they eliminate any "apparent" impedance discontinuity for the microwaves and hence that no reflection occurs at the transition), we accordingly have $z_{in}=k_T g_p+jk_T(b_p-t_s^{-1})$ from which the clarified expression of the matching characteristic is:

$$\frac{P_R}{P_t} = \frac{(g_p - k_T^{-1})^2 + \left(b_p - 0\cotan\left(\frac{2\pi l_s}{\lambda_g}\right)\right)^2}{(g_p + k_T^{-1})^2 + \left(b_p - \cotan\left(\frac{2\pi l_s}{\lambda_g}\right)\right)^2}$$

The minimum reflected power is then:

$$\min\left(\frac{P_R}{P_I}\right) = \frac{(k_T g_p - 1)^2}{(k_T g_p + 1)^2} = \frac{(g_p - k_T^{-1})^2}{(g_p + k_T^{-1})^2}$$

and it occurs for the normalized position of the short-circuit piston:

$$\left(\frac{l_s}{\lambda_g}\right)_{min} = \frac{1}{2\pi}\text{arccotan}\, b_p$$

An exemplary applicator of the surfaguide type, according to the invention, is shown in FIGS. 5A-5C and is prepared from a configuration with two ridges 23 between which the energy is concentrated to launch the surface wave, without altering the preceding electrodynamic analysis.

This arrangement serves to vertically position the energy concentration zone with regard to the mediator plane of the standard waveguide, to maintain the same external geometry as with the conventional thinned waveguide applicator of commercial Universal Plasma Abatement Systems (UPAS) and to permit the upgrading of the systems without any other modification.

The ridges 23 comprise orifices 25 for the passage of the tube defining the shape of the launch interstice.

The impedance composition is obtained by cutting at a certain length, along a transverse plane of the waveguide, the end of the gradual wedge 22 of the two ridges 23.

In the configuration shown, the length of the device has been reduced to the minimum, that is, the boundary of the flanges 127, 129 for connecting the waveguide just coincide with the ends of the impedance transformers. The gradual wedge 22 is truncated on the generator side and there is an abrupt cross section termination of the ridge on the short-circuit side 29.

The ridge surfaguide applicator is found to be easier to make mechanically than the thinned waveguide surfaguide applicator.

In fact, it suffices to add to the standard waveguide section the two ridges 23 which are simple parts to machine, and to fix them to the large faces 20, 26 on either side of the waveguide by screws or by a weld, thereby ensuring good electrical contact. The orifices 25 for passage of the surface-wave tube are arranged in the ridges.

The ridges, which do not occupy the entire internal width of the waveguide (s<a), do not require a continuous weld of the side surfaces as would have been the case for a RHW surfaguide applicator.

The general shape of the applicator of the invention lends itself well to manufacturing modes which serve to reduce the cost and weight of the device. Thus it is possible to make a part in a single piece machined from a light alloy block by wire electrical discharge machining.

Figure 6:
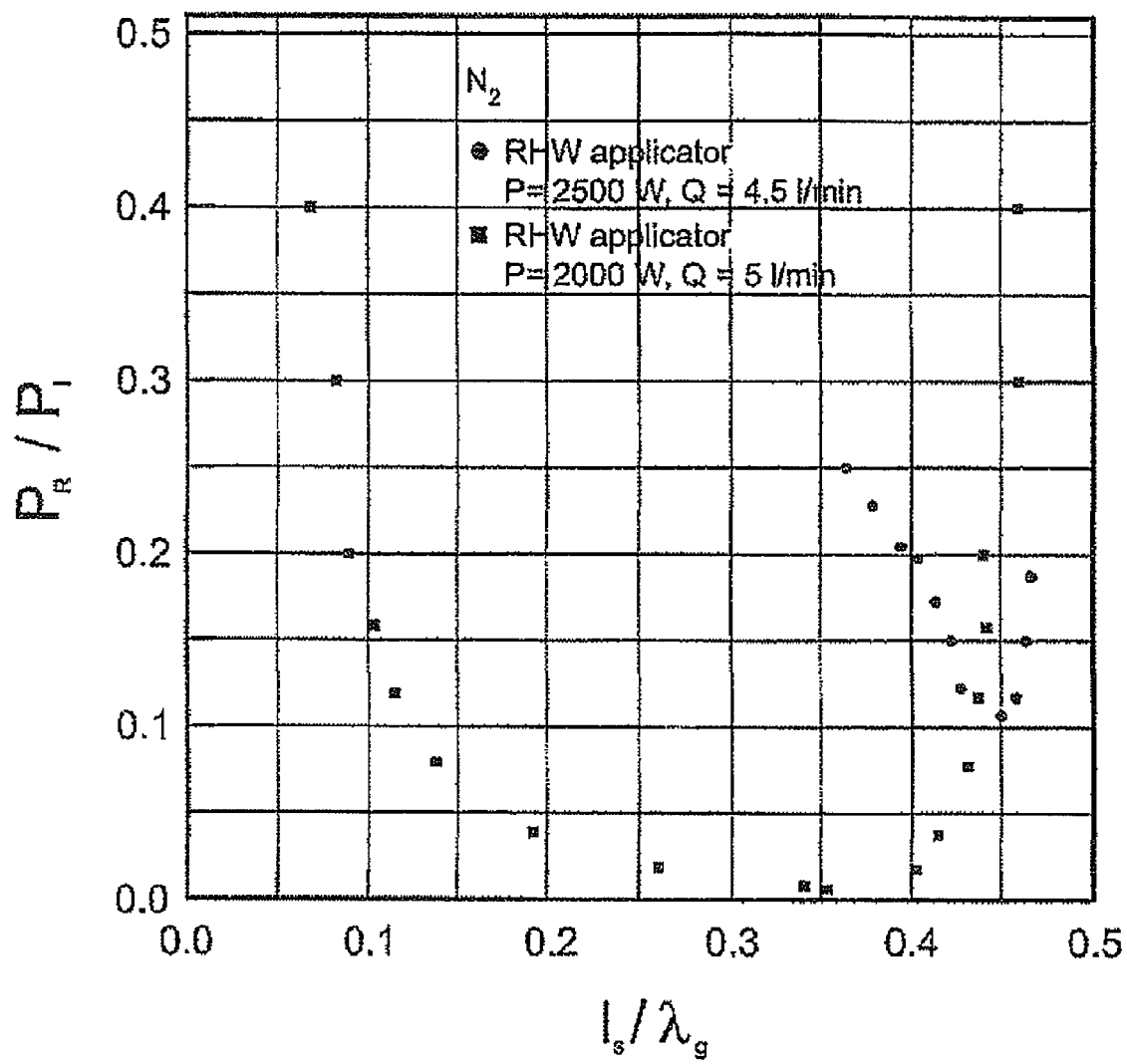
FIG. 6 shows a matching characteristic of a device according to the invention.

FIG. 6 shows an example of impedance matching characteristics for an atmospheric surface-wave plasma source constructed on a surfaguide applicator, with a waveguide according to the invention.

More precisely, the $P_R/P_I$ ratio (reflected power to incident power) is shown on the y-axis, as a function of the ratio $l_s/\lambda_g$.

These characteristics are characterized by the minimum value, close to 0, of the ratio $P_R/P_I$ and by the width of this zone where the reflected power is virtually zero.

A very clear progression is observed, represented by the black squares, compared with the characteristic of a thinned waveguide applicator and conventional surfaguide, shown for reference (black points).

Once the fine-tuning is terminated, the applicator is equipped with a fixed short-circuit in the optimal position found for the mobile short-circuit, generally corresponding to the middle of the excursion zone of $l_s/\lambda_g$ where $P_R/P_I$ is lower than a certain value, for example 5%.

This quality of the impedance matching can be used in another way: in industrial operation at high power, the surface-wave tube is highly loaded in the maximum energy density zone at the launch interstice.

To increase the long-term reliability, the energy density distribution can be optimized at this level by adjusting the geometry of the launch interstice.

This was inconceivable in the case of the conventional surfaguide applicator because the quality of the energy coupling deteriorated very rapidly as soon as changes were made to the orifice diameter, the slenderness ratio, the wall thickness of the interstice, or even the roundoff of its edge.

In the case of the applicator according to the invention, the matching was much less delicate, making it possible to find a reasonable compromise with the energy coupling quality.

The general structure of an applicator according to the invention, for a waveguide-supported axial injection type of torch (TIAGO) is inferred in the same way from the generic structure.

In general, for this type of torch, an asymmetrical applicator with a single ridge is used, because the power is extracted by the torch nozzle on only one side of the waveguide.

In the case of a waveguide-supported axial injection type of torch (TIAGO) and a waveguide according to the invention, the nozzle extends from the top of the ridge across the energy concentration region before terminating at the exterior of the waveguide through the orifice made in its large opposite face.

The nozzle with its feed channel is fixed to the ridge by a mechanical assembly guaranteeing electrical continuity, and permitting efficient dismantling for maintenance.

Figure 7:
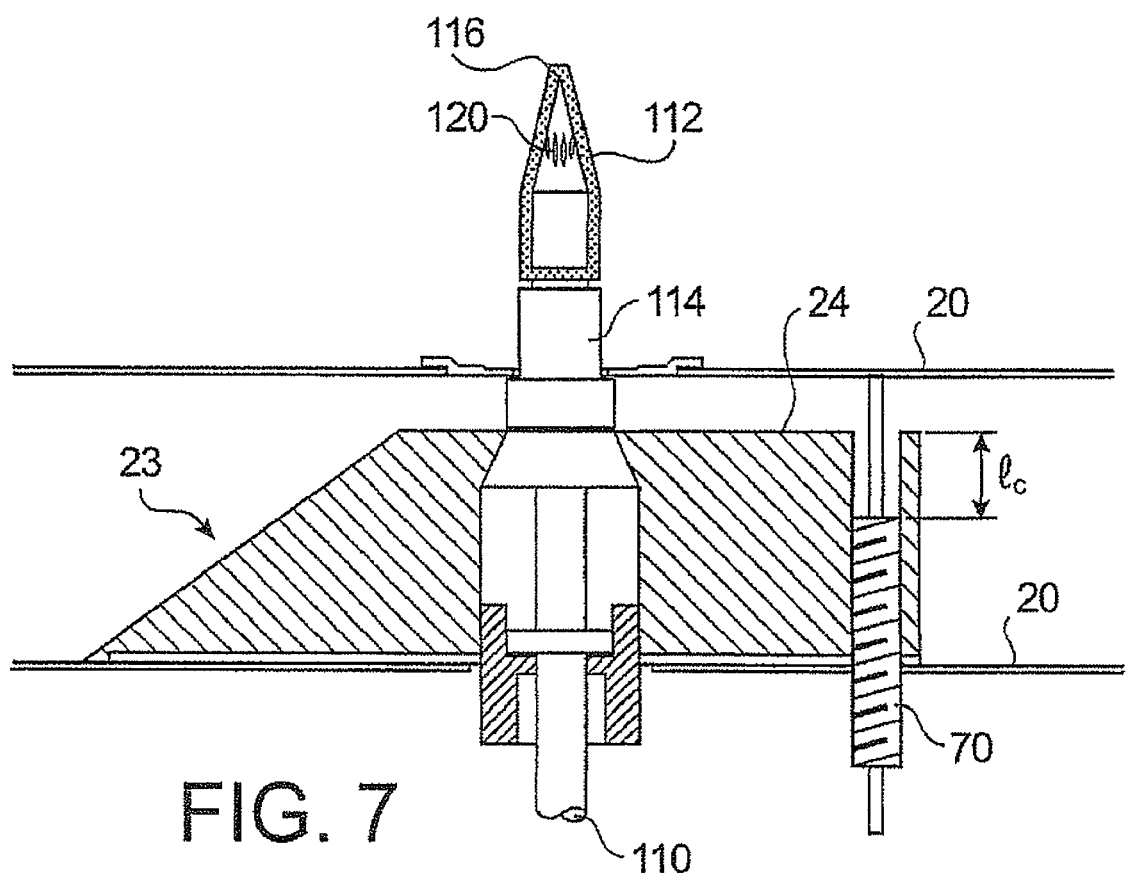
FIG. 7 shows a matching embodiment of a device according to the invention.

An exemplary embodiment of an applicator of the invention is shown in FIG. 7.

The structure of the nozzle end in not shown in detail.

In this example, the inductive compensation means comprise a conducting rod 60 extending from the upper face 24 of the ridge to the electrical contact with the large face 26 of the waveguide opposite.

The axis of the rod substantially coincides with the intersection of the mediator vertical plane of the waveguide and the transverse plane containing the straight end of the ridge on the waveguide short-circuit side.

This rod is supplemented by a coaxial plunger 70, adjustable, screw type, located in the body of the ridge.

Once the optimal setting configuration is established, the position of the piston or the screw can be made stationary.

Any other configuration than the one illustrated previously is basically possible. A confined microwave concentration zone and a circular interstice for coupling the energy with a plasma are located in a section 24 of a constant section ridge waveguide, comprising either a dielectric surface-wave plasma tube, or a plasma torch conducting nozzle.

The portion with a constant ridge cross section extends on either side of the axis of the interstice over distances of multiple integers of $$\frac{\lambda_{g1}}{4},$$

one quarter of the propagation length in the ridge waveguide of the section considered.

The ridge waveguide section is connected on either side of the standard hollow rectangular waveguide 20, 26 by two impedance transformers.

The torch shown comprises an input 110 for the gases and, on the other side of the wall 20, an output 116 at the tip of the nozzle which allows the gas in which the plasma is sustained to escape, this output comprising for example a nozzle tip equipped with holes 120, the base of the part of the torch located in the wall 120 being sectionally surrounded by a spacer 112 made from dielectric material, Teflon or ceramic, designed to mechanically block the interstice to prevent contamination of the interior of the waveguide by the aggressive atmosphere prevailing in the nozzle during the treatment of hazardous gases, by permitting the passage of the microwave power.

A device according to the invention can in fact be used in the context of a process for treating a gas, comprising impurities, in which the gas at substantially atmospheric pressure is subjected to a plasma discharge.

The treated gas is, for example, a rare gas to be purified containing a perfluorinated (PFC) or hydrocarbon or hydrofluorocarbon (HFC) gas, or comprising gaseous effluents issuing from a method for the production or growth or etching or cleaning or treatment of semiconductors or of semiconducting or conducting or dielectric thin films or of substrates, or comprising gaseous effluents issuing from a method for the production or growth or etching or cleaning or treatment of thin films of silicon or silicon alloys.

A device according to the invention can also be used with a source as described in EP 874 537.

According to the invention, the microwave concentration zone corresponds to a confined space defined between the top of the ridge and the large corresponding opposite face of the waveguide.

In an alternative, illustrated particularly in FIG. 2, there are two ridges each extending from one of the large faces of the waveguide and the microwave concentration zone is located between the two ridges. This configuration serves to place the launch interstice on a different side and hence to adjust the positioning of the discharge tube with regard to the waveguide to adapt to external dimensional requirements.

A ridge waveguide section according to the invention presents, in comparison with the thinned standard waveguide of the previous case, better propagation characteristics and broader impedance matching conditions.

As in the case of the thinned waveguide, the constant section ridge waveguide section, where the microwave concentration takes place, can be connected to a standard hollow rectangular waveguide, by providing an intermediate impedance transformation structure between the two. It is also possible to supply the plasma source via a constant section ridge waveguide from the generator, but in actual fact, commercial microwave equipment and components are generally constructed on the standard hollow rectangular waveguide.

Unlike the known devices, it is unnecessary to provide a gradual transition on the impedance matching short-circuit side. Thus the ridge can be terminated as an abrupt step on a cross section, as shown above. This serves to simplify and shorten the structure. This would not function in the case of a thinned waveguide in which the two gradual transitions are absolutely necessary.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A microwave plasma exciter device, comprising:
   a) a waveguide, in which means are placed for concentrating the microwaves, the waveguide having a width (a), the microwave concentration means having a width (s), where a>s; and
   b) means for coupling a microwave power to generate a plasma, placed in a microwave concentration zone.

2. The device of claim 1, the microwave concentration means comprising impedance transformation means between a first side, called the generator side, and a second side, called the short-circuit side.

3. The device of claim 1, the microwave concentration means comprising a gradual thickness transition zone.

4. The device of claim 1, the microwave concentration means comprising double quarter-wave discrete transformer means.

5. The device of claim 1, the microwave concentration means comprising an abrupt transition zone between the first part and the second part.

6. The device of claim 1, comprising at least one ridge extending along a longitudinal face of the waveguide.

7. The device of claim 6, comprising two ridges extending from two opposite longitudinal faces of the waveguide.

8. The device of claim 7, the two ridges being symmetrical to one another.

9. The device of claim 7, the two ridges not being symmetrical to one another.

10. The device of claim 1, the s/a ratio being between 0.3 and 0.6.

11. The device of claim 1, the waveguide comprising a generator side and a short-circuit side and the microwave concentration means, and having a gradual termination on the generator side and an abrupt termination, in a cross section of the short-circuit side ridge.

12. The device of claim 1, the plasma generating means comprising a microwave axial injection torch type plasma source or a surface wave type plasma source.

13. A method for treating a gas, comprising impurities, in which the gas at substantially atmospheric pressure is subjected to a discharge from the device of claim 1.

14. The method of claim 13, the treated gas being a rare gas containing a perfluorinated (PFC) gas or hydrocarbon or hydrofluorocarbon (HFC) gas.

15. The method of claim 13, the treated gas comprising gaseous effluents issuing from a method for the production or growth or etching or cleaning or treatment of semiconductors or of semiconducting or conducting or dielectric thin films or of substrates.

16. The method of claim 15, the treated gas comprising gaseous effluents issuing from a method for the production or growth or etching or cleaning or treatment of thin films of silicon or silicon alloy.

* * * * *

UNITED STATES PATENT AND TRADEMARK OFFICE
CERTIFICATE OF CORRECTION

| | | |
|---|---|---|
| PATENT NO. | : 7,799,119 B2 | Page 1 of 1 |
| APPLICATION NO. | : 11/766875 | |
| DATED | : September 21, 2010 | |
| INVENTOR(S) | : Z. Zakrzewski et al. | |

It is certified that error appears in the above-identified patent and that said Letters Patent is hereby corrected as shown below:

In Column 16, line 15, replace the words "torch type" with the word --torch--.

In Column 16, line 16, replace the words "wave type" with the word --wave--.

Signed and Sealed this
Third Day of May, 2011

David J. Kappos
*Director of the United States Patent and Trademark Office*